United States Patent
Calin

(10) Patent No.: US 9,408,206 B2
(45) Date of Patent: Aug. 2, 2016

(54) RESOURCE ALLOCATION IN SUPPORT OF VOICE OVER INTERNET PROTOCOL (VOIP) IN A ORTHOGONAL FREQUENCY DIVISION MULTIPLE ACCESS (OFDMA) SYSTEM

(71) Applicant: Alcatel-Lucent USA Inc., Murray Hill, NJ (US)

(72) Inventor: Doru Calin, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 155 days.

(21) Appl. No.: 14/100,006

(22) Filed: Dec. 8, 2013

(65) Prior Publication Data

US 2015/0163784 A1     Jun. 11, 2015

(51) Int. Cl.
| | | |
|---|---|---|
| *H04W 72/04* | (2009.01) | |
| *H04W 28/06* | (2009.01) | |
| *H04L 1/00* | (2006.01) | |
| *H04L 5/00* | (2006.01) | |
| *H04W 72/10* | (2009.01) | |

(52) U.S. Cl.
CPC ............ *H04W 72/044* (2013.01); *H04L 1/0003* (2013.01); *H04L 5/003* (2013.01); *H04W 28/06* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 7,706,456 | B2 * | 4/2010 | Laroia et al. | 375/260 |
| 8,121,115 | B2 * | 2/2012 | Frankkila et al. | 370/389 |
| 8,638,732 | B2 * | 1/2014 | Lim et al. | 370/329 |
| 2006/0269005 | A1 * | 11/2006 | Laroia et al. | 375/260 |
| 2007/0019717 | A1 * | 1/2007 | Laroia et al. | 375/222 |
| 2007/0298728 | A1 * | 12/2007 | Imamura et al. | 455/77 |
| 2008/0008203 | A1 * | 1/2008 | Frankkila et al. | 370/412 |
| 2010/0278034 | A9 * | 11/2010 | Laroia et al. | 370/209 |
| 2013/0322349 | A1 * | 12/2013 | Hosangadi et al. | 370/329 |

OTHER PUBLICATIONS

Doru Calin: VoIP Over Realistic IEEE 802.16e system scenarios: The uplink direction, IEEE Global Communications Conference—Globecom 2012, Dec. 3, 2012, pp. 3360-3364, XP032375190, NJ, US.

Jani Puttonen et al: "Voice-Over-IP Performance in UTRA Long Term Evolution Downlink", IEE Vehicular Technology Conference—VTC 2008, May 11, 2008, pp. 2502-2506, XP031256015, NJ, USA.

(Continued)

*Primary Examiner* — Eunsook Choi
(74) *Attorney, Agent, or Firm* — Niraj A. Desai

(57) ABSTRACT

Method and apparatus for allocating resources to real-time traffic communication in an Orthogonal Frequency Division Multiple Access (OFDMA) based system are provided. An example method includes assigning, selecting, mapping and transmitting. One or more Voice Over Internet Protocol (VoIP) packets are assigned to a single bundled packet. A first modulation and coding scheme (MCS) of a set of MCSs is selected. The first MCS is the one MCS of the set of MCSs capable of mapping the bundled packet to a smallest possible amount of physical OFDMA resources while addressing one or more negative impacts of interference on a link associated with the real-time traffic communication. The bundled packet is mapped to the smallest possible amount of physical OFDMA resources based on the first MCS selected. The bundled packet is transmitted using the first MCS selected and over the smallest possible amount of physical OFDMA resources mapped.

19 Claims, 6 Drawing Sheets

| Header/trailer Overhead | VoIP Packets Bundling | |
|---|---|---|
| | No Bundling | 2 packets bundling |
| Compressed RTP/UDP/IP (bits) | 32 | 64 |
| MAC Header (bits) | 48 | 48 |
| CRC (bits) | 32 | 32 |
| Total (bits) | 112 | 144 |

(56) References Cited

OTHER PUBLICATIONS

Patrick Hosein Ed—Ho Huat Peh et al: "A Framework for Supporting VoIP Services over the Downlink of an OFDMA Network", IEEE 2nd International Symposium on Wireless Pervasive Computing—ISWPC 2007, Feb. 1, 2007, XP031072480, USA.
PCT International Search Report—PCT/US2014/063973—Date of mailing Feb. 5, 2015—5 pages.
PCT Written Opinion of the International Searching Authority—PCT/US2014/063973—Date of mailing Feb. 5, 2015—6 pages.
P802.16Rev2/D4, "Part 16: Air Interface for Broadband Wireless Access Systems" Apr. 2008, IEEE—1996 pages.
WIMAX Forum, "Mobile System Profile" Release 1.0 Revision 1.2.2, Nov. 17, 2006, www.wimaxforum.org/technology—90 pages.

\* cited by examiner

| Header/trailer Overhead | VoIP Packets Bundling | |
|---|---|---|
| | No Bundling | 2 packets bundling |
| Compressed RTP/UDP/IP (bits) | 32 | 64 |
| MAC Header (bits) | 48 | 48 |
| CRC (bits) | 32 | 32 |
| Total (bits) | 112 | 144 |

*FIG. 1*

| EVRC Vocoder Rate | Probability of usage | 20 ms frame size (bits) | Speech Payload + Header/Trailer Overhead (bits) | |
|---|---|---|---|---|
| | | | No bundling | 2 packets bundling |
| Full | 0.29 | 171 | 283 | 486 |
| Half | 0.04 | 80 | 192 | 304 |
| Quarter | 0.07 | 40 | 152 | 224 |
| Eight | 0.6 | 16 | 128 | 176 |

*FIG. 2*

| Burst size (# of OFDMA slots) | MCS |
|---|---|
| 6 | QPSK Rate 1/2 |
| 4 | QPSK Rate 1/2, QPSK Rate 3/4 |
| 3 | QPSK Rate 1/2, QPSK Rate 3/4, 16QAM Rate 1/2 |
| 2 | QPSK Rate 3/4, 16QAM Rate 1/2, 16QAM Rate 3/4 |
| 1 | 16QAM 3/4 |

*FIG. 3*

| Burst size (# of OFDMA slots) | MCS |
|---|---|
| 10 | QPSK Rate 1/2 |
| 8 | QPSK Rate 1/2 |
| 7 | QPSK Rate 1/2, QPSK Rate 3/4 |
| 6 | QPSK Rate 1/2, QPSK Rate 3/4 |
| 5 | QPSK Rate 1/2, QPSK Rate 3/4, 16QAM Rate 1/2 |
| 4 | QPSK Rate 1/2, QPSK Rate 3/4, 16QAM Rate 1/2, 16QAM Rate 3/4 |
| 3 | QPSK Rate 3/4, 16QAM Rate 1/2, 16QAM Rate 3/4 |
| 2 | 16QAM Rate 1/2, 16QAM Rate 3/4, 64QAM Rate 3/4, 64QAM Rate 5/6 |
| 1 | 64QAM Rate 2/3, 64QAM Rate 3/4, 64QAM Rate 5/6 |

*FIG. 4*

RESOURCE ALLOCATION IN SUPPORT OF VOICE OVER INTERNET PROTOCOL (VOIP) IN A ORTHOGONAL FREQUENCY DIVISION MULTIPLE ACCESS (OFDMA) SYSTEM

FIELD OF THE INVENTION

The invention relates to the resource allocation for Voice Over Internet Protocol (VoIP) service over Orthogonal Frequency Division Multiple Access (OFDMA) based access systems.

BACKGROUND

Modern wireless communication systems rely on packet based transmission, which permits real-time multiplexing of multiple connections from different mobile devices as a means to increase the system capacity. In general, speech traffic is encoded using a fixed-rate or variable-rate encoder. While various types of codecs can be considered, a four-state Enhanced Variable Rate Codec (EVRC), which generates full-rate, half-rate, quarter-rate and eight-rate frames is considered as an example. This codec has been standardized for voice support in the cdma2000 1x and High Rate Packet Data (HRPD) standards. Each VoIP packet (or a bundle of packets) can be mapped to a physical Orthogonal Frequency Division Multiple Access (OFDMA) resource entity/burst (e.g., such physical resource entities are called "bursts" in WiMAX) and may correspond to one or more Medium Access Control (MAC) Protocol Data Units (PDUs) (MAC PDUs).

Since VoIP packets are relatively small in size, a single MAC PDU may be preferred to transport the contents of one or more VoIP packets thus minimizing the header and cyclic redundancy check (CRC) overhead. This allows the Hybrid Automatic Request (HARM) mechanism to operate on a per-burst basis, since the Cyclic Redundancy Check (CRC) is embedded in the MAC PDU.

The MAC PDU overhead accounts for a number of bits that need to be transmitted along with a payload that contains the information bits. For example, in the Worldwide Interoperability for Microwave Access (WiMAX) standard, the MAC PDU overhead may be as large as ten (10) bytes, resulting from six (6) bytes MAC header overhead and four (4) bytes of CRC). Robust header compression (ROHC) may be employed to reduce the original forty (40) bytes of Real Transport Protocol/User Datagram Protocol/Internet Protocol (RTP/UDP/IP) overhead to four (4) bytes only.

For WiMAX, the total header/trailer overhead with and without packet bundling (bundling of only two packets illustrated) is represented in the table of FIG. 1. Thus, FIG. 1 illustrates that when VoIP packet bundling. is employed with only one (1) VoIP packet bundled (i.e., no bundling of multiple VoIP packets), the RTP/UDP/IP overhead comprises thirty-two bits (i.e., four (4) bytes), the MAC header comprises forty-eight bits (i.e., six (6) bytes), and the CRC comprises thirty-two bits (i.e., four (4) bytes) for a total of one-hundred-twelve bits (i.e., fourteen (14) bytes). If two VoIP packets are bundled into the VoIP bundle, RTP/UDP/IP overhead comprises two (2) times thirty-two bits=sixty-four bits, while the MAC header and the CRC remain the same size giving a total bundle size of one-hundred-forty-four bits (i.e., eighteen (18) bytes). Bundling of additional VoIP packets would similarly increase the size of the RTP/UDP/IP overhead and the VoIP bundle.

The table of FIG. 2 illustrates the VoIP packet sizes including overhead—with and without bundling—at the output of an example EVRC speech codec. Other EVRC speech codecs may be utilized. FIG. 2 illustrates for a particular EVRC vocoder rate, the corresponding probability of usage, 20 ms frame size, and the speech/payload plus header/trailer overhead with bundling of one (1) packet (i.e., no bundling) and the bundling to two (2) packets. For example, with no bundling, the example EVRC vocoder produces a two-hundred-eighty-three (283) bit VoIP packet, a one-hundred-ninety-two (192) bit VoIP packet, a one-hundred-fifty-two (152) bit VoIP packet, and a one-hundred-twenty-eight (128) bit VoIP packet at the full rate, half rate, quarter rate and eighth rate respectively. Other EVRC speech codecs may produce different size VoIP packets at the respective rates illustrated.

SUMMARY

Delay sensitive applications such as VoIP, pose significant challenges in the design of wireless network infrastructures due to their stringent Quality of Service (QoS) requirements and due to the typical hostile radio environment. User mobility is obviously an extra-dimension that adds to the overall complexity of the challenges posed, as it becomes more difficult to predict radio channel conditions and hence, to allocate resources efficiently for users moving at high speeds. VoIP applications are typically characterized by tight air-interface delay budgets (usually on the order of tens of ms) and a typical QoS target of less than 1%-2% packet loss for 95%-98% of active VoIP users. A real-time communication may be characterized as a communication subject to a delay constraint. Other than a real-time communication may be characterized as a communication that is not subject to a delay constraint but may be delivered using a best effort delivery.

In order to efficiently adapt to the conditions of the wireless communication channels, it is desirable to rely on intelligent mechanisms that allow for efficient selection of the Modulation and Coding Scheme (MCS) utilized and the combating of interference. For that purpose, the dynamic selection of the MCS scheme utilized is a key factor in the decisions for resource allocation. Selecting one of the more robust MCSs, which are designed to operate in difficult radio conditions, when the interference is high, leads to larger encoded packets (bursts), which in turns results in more activity, and consequently to a larger spread of interference which may affect other ongoing wireless calls. On the other hand, selecting a less robust MCS, which is designed to operate in favorable radio conditions, leads to smaller encoded packets (bursts), but at the risk of higher packet errors if the radio channel changes rapidly and the packet transmission does not have enough protection to fight the eventual signal fades. The mechanisms for resource allocation and MCS selection disclosed herein are designed to maximize the probability of success of a VoIP packet transmission.

In one embodiment, an apparatus is provided for allocating resources to real-time traffic communication in an Orthogonal Frequency Division Multiple Access (OFDMA) based system The apparatus includes a processor and an associated memory, and the processor is configured to: assign one or more Voice Over Internet Protocol (VoIP) packets to a single bundled packet; select a first modulation and coding scheme (MCS) of a set of MCSs, the first MCS being the one MCS of the set of MCSs capable of mapping the bundled packet to a smallest possible amount of physical OFDMA resources while addressing one or more negative impacts of interference on a link associated with the real-time traffic communication; map the bundled packet to the smallest possible amount of physical OFDMA resources based on the first MCS selected; and transmit the bundled packet using the first MCS selected over the smallest possible amount of physical OFDMA resources mapped.

In one embodiment, the smallest possible amount of physical OFDMA resources include at least one time symbol and at least one subcarrier within an OFDMA frame or OFDMA sub-frame.

In one embodiment, the processor is configured to assign a plurality of VoIP packets to the single bundled packet for transmission in a downlink.

In one embodiment, the processor is configured to assign one VoIP packet to the single bundled packet for transmission in an uplink.

In one embodiment, the processor is configured to vary a number of VoIP packets assigned to the single bundled packet in accord with at least one radio channel condition of the link associated with the real-time traffic communication.

In one embodiment, the processor is configured to randomize allocations of VoIP bursts across time and frequency in one or more of downlink OFDMA sub-frames and OFDMA uplink sub-frames.

In one embodiment, the processor is configured to perform a number of random allocation attempts to fit a VoIP burst within an OFDMA frame or OFDMA sub-frame.

In one embodiment, the processor is configured to employ a search algorithm to find one or more suitable locations within the OFDMA frame or the OFDMA sub-frame where the VoIP burst can be fit if the number of random allocation attempts fails to produce a successful allocation for the VoIP burst.

In one embodiment, the processor is configured to employ a search algorithm to find one or more suitable locations within an OFDMA frame or OFDMA sub-frame where a VoIP burst can be fit.

In one embodiment, the processor is configured to map the bundled packet to the smallest possible amount of physical OFDMA resources while employing inter-base station coordination.

In one embodiment, the processor is configured to map the bundled packet to the smallest possible amount of physical OFDMA resources for downlink while prioritizing exploitation of frequency diversity.

In one embodiment, the processor is configured to: map the bundled packet to the smallest possible amount of physical OFDMA resources for uplink prioritizing exploitation of time domain.

In one embodiment, the processor is configured to map the bundled packet to the smallest possible amount of physical OFDMA resources wherein a VoIP burst is mapped in time domain first, and then in frequency domain.

In one embodiment, the processor is configured to select a most robust MCS scheme of a sub-set of the set of MCSs which produce a burst of similar size after a VoIP packet encoding.

In one embodiment, the processor is configured to select as the first MCS the MCS of the set of MCSs for mapping the bundled packet to a smallest possible amount of physical OFDMA resources which also maximizes the probability of success of communication of the bundled packet.

Another embodiment is a method for allocating resources to real-time traffic communication in an Orthogonal Frequency Division Multiple Access (OFDMA) based system. The method includes assigning at a network element one or more Voice Over Internet Protocol (VoIP) packets to a single bundled packet; selecting at the network element a first modulation and coding scheme (MCS) of a set of MCSs, the first MCS being the one MCS of the set of MCSs capable of mapping the bundled packet to a smallest possible amount of physical OFDMA resources while addressing one or more negative impacts of interference on a link associated with the real-time traffic communication; mapping at the network element the bundled packet to the smallest possible amount of physical OFDMA resources based on the first MCS selected; and transmitting from the network element the bundled packet using the first MCS selected over the smallest possible amount of physical OFDMA resources mapped.

In one embodiment, the smallest possible amount of physical OFDMA resources include at least one time symbol and at least one subcarrier within an OFDMA frame or OFDMA sub-frame.

In one embodiment, said assigning comprises assigning a plurality of VoIP packets to the single bundled packet for transmission in downlink from a base station to a mobile device.

In one embodiment, said assigning comprises assigning one VoIP packet to the single bundled packet for transmission in uplink from a mobile device to a base station.

In one embodiment, said assigning comprises varying a number of VoIP packets assigned to the single bundled packet in accord with at least one radio channel condition of the link associated with the real-time traffic communication.

In one embodiment, said mapping the bundled packet to the smallest possible amount of physical OFDMA resources includes randomized allocations of VoIP bursts across time and frequency in one or more of downlink OFDMA sub-frames and OFDMA uplink sub-frames.

In one embodiment, said mapping the bundled packet to the smallest possible amount of physical OFDMA resources includes a number of random allocation attempts to fit a VoIP burst within an OFDMA frame or OFDMA sub-frame.

In one embodiment, said mapping the bundled packet to the smallest possible amount of physical OFDMA resources includes employing a search algorithm to find one or more suitable locations within the OFDMA frame or the OFDMA sub-frame where the VoIP burst can be fit when the number of random allocation attempts fails to produce a successful allocation for the VoIP burst.

In one embodiment, said mapping the bundled packet to the smallest possible amount of physical OFDMA resources includes employing a search algorithm to find one or more suitable locations within an OFDMA frame or OFDMA sub-frame where a VoIP burst can be fit.

In one embodiment, said mapping the bundled packet to the smallest possible amount of physical OFDMA resources is performed with inter-base station coordination.

In one embodiment, said mapping the bundled packet to the smallest possible amount of physical OFDMA resources is performed prioritizing for downlink exploitation of frequency diversity.

In one embodiment, said mapping the bundled packet to the smallest possible amount of physical OFDMA resources is performed prioritizing for uplink exploitation of time domain.

In one embodiment, said mapping the bundled packet to the smallest possible amount of physical OFDMA resources comprises mapping a VoIP burst in time domain first, and then in frequency domain, or mapping a VoIP burst in domain frequency first, and then in time domain.

In one embodiment, said selecting the first of a set of MCSs selects a most robust MCS scheme of a sub-set of the set of MCSs which produces a burst of similar size after a VoIP packet encoding.

In one embodiment, said selecting the MCS of the set of MCSs for mapping the bundled packet to a smallest possible amount of physical OFDMA resources maximizes the probability of success of communication of the bundled packet.

In one embodiment, one or more of the steps of the method are performed on a packet by packet basis.

BRIEF DESCRIPTION OF THE DRAWINGS

Embodiments of the invention will now be described further, with reference to the accompanying drawings, in which:

FIG. 1 is a table illustrating the total header/trailer overhead with and without bundling;

FIG. 2 is a table illustrating VoIP packet sizes including overhead—with and without bundling—at the output of an EVRC speech codec;

FIG. 3 is a table illustrating the uplink burst sizes and corresponding MCSs (no usage of the 64 QAM modulations in the uplink) required to communicate the VoIP packets resulting from a EVRC vocoder, as represented in FIG. 2, without bundling multiple VoIP packets;

FIG. 4 is a table illustrating the downlink burst sizes and corresponding MCSs required to communicate the VoIP packets resulting from a EVRC vocoder, as represented in FIG. 2, while employing bundling of two VoIP packets;

Figure 5:
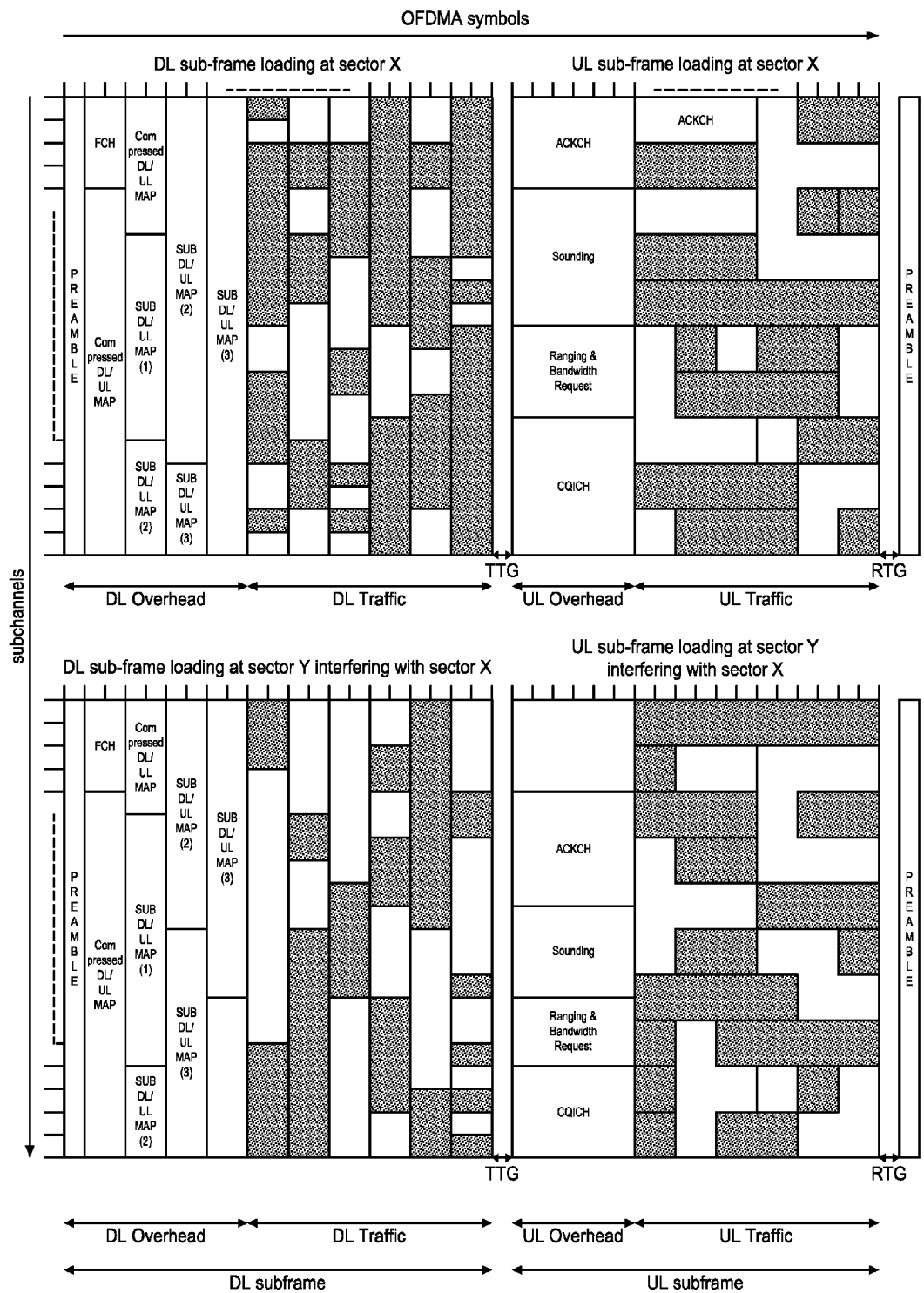
FIG. 5 illustrates a representative snapshot of traffic loading of the WIMAX Time Division Duplexing (TDD) downlink (DL) and uplink (UL) sub-frames from two mutually interfering sectors (e.g., sector X and sector Y) according to the principles of the invention.

Specific embodiments of the invention are disclosed below with reference to the Figures. Both the description and the illustrations have been drafted with the intent to enhance understanding. For example, the dimensions of some of the figure elements may be exaggerated relative to other elements, and well-known elements that are beneficial or even necessary to a successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the described embodiments in view of what is already known in the art. One of skill in the art will appreciate that various modifications and changes may be made to the specific embodiments described below without departing from the spirit and scope of the invention. Thus, the specification and drawings are to be regarded as illustrative and exemplary rather than restrictive or all-encompassing, and all such modifications to the specific embodiments described below are intended to be included within the scope of the invention.

DESCRIPTION OF EMBODIMENTS

To provide a greater degree of detail in making and using various embodiments of the invention, a description of the approach taken to communications in networks, and a description of certain, quite specific, embodiments follows for the sake of example.

In order to efficiently adapt to the conditions of the wireless communication channels, it is desirable to rely on intelligent mechanisms provided herein that allow for efficient selection of the Modulation and Coding Scheme (MCS) utilized and the combating of interference. The mechanisms for resource allocation and MCS selection disclosed herein are designed to maximize the probability of success of a VoIP packet transmission.

Accordingly, methods and apparatuses for allocating resources to real-time traffic communication in an Orthogonal Frequency Division Multiple Access (OFDMA) based system are provided. An example method includes Voice Over Internet Protocol (VoIP) packets bundling, selection of a modulation and coding scheme (MCS) capable of mapping the bundled packet to a smallest possible amount of physical OFDMA resources while addressing one or more negative impacts of interference on a link associated with the real-time traffic communication followed by mapping according and transmission of a bundled packet according to the MCS selected. Each aspect of the methodology will be addressed in turn in the following.

Packet Bundling

A single MAC PDU may be utilized to transport the contents of one or more VoIP packets thus minimizing the header and cyclic redundancy check (CRC) overhead. In one embodiment, the use of VoIP packet bundling at the base station in downlink, i.e., when creating MAC PDUs, is considered. This form of bundling offers the advantage of reducing overhead at the expense of some additional delay given by N*20 ms where N is the number of VoIP packets that are bundled into a single packet and 20 ms is the VoIP packet generation interval. Packet bundling offers the benefit that a single MAC header may be used for a bundled VoIP packet containing payload from multiple VoIP packets; however, the compressed header is still needed for each constituent packet. Packet bundling also allows the Media Access Protocol (MAP) overhead to be reduced since fewer bursts may need to be scheduled for transmission over the air interface (air link).

In another embodiment, packet bundling is not used in uplink. Bundling is not necessarily a good solution for the uplink (packets are longer and may force operations with smaller power spectral densities; e.g., in WiMAX, it is possible that bundled packets may need to be accommodated over multiple uplink sub-channels).

In another embodiment, VoIP packet bundling is performed dynamically, per Mobile Station (MS), both in downlink and uplink, or either in downlink or in uplink, to exploit the quality peaks in radio channel conditions a MS may observe, and to enable opportunistic scheduling of user data. It should be noted that a bundled packet may include the payload of one or more VoIP packets.

MCS Selection

Given a bit size of a bundled packet and a set of potential MCSs with which to communicate the bundled packet, a burst size (i.e., number of OFDMA slots) required to transport the burst corresponding to an individual MCS can be determined. FIG. 3 is an example table illustrating the uplink burst sizes and corresponding MCSs (no usage of the 64 QAM modulation in the uplink) required to communicate the VoIP packets from a EVRC vocoder, as represented in FIG. 2, without bundling multiple VoIP packets (i.e., a packet without multiple VoIP packets bundling, in other words a single VoIP packet).

For example, a two-hundred-eighty-three (283) bit VoIP packet may be communicated using QPSK Rate ½ using of burst size of six (6), a one-hundred-ninety-two (192) bit VoIP packet may be communicated using QPSK Rate ½ using of burst size of four (4), a one-hundred-fifty-two (152) bit VoIP packet may be communicated using QPSK Rate ½ using of burst size of four (4), and a one-hundred-twenty-eight (128) bit VoIP packet may be communicated using QPSK Rate ½ using of burst size of three (3). For QPSK Rate ¾, a two-hundred-eighty-three (283) bit VoIP packet may be communicated using a burst size of four (4), a one-hundred-ninety-two (192) bit VoIP packet may be communicated using a burst size of three (3), a one-hundred-fifty-two (152) bit VoIP packet may be communicated using a burst size of three (3), and a one-hundred-twenty-eight (128) bit VoIP packet may be communicated using a burst size of two (2). Likewise, for 16QAM Rate ½, a two-hundred-eighty-three (283) bit VoIP packet may be communicated using three (3) bursts, a one-hundred-ninety-two (192) bit VoIP packet may be communicated using two (2) bursts, a one-hundred-fifty-two (152) bit VoIP packet may be communicated using two (2) bursts, and a one-hundred-twenty-eight (128) bit VoIP packet may be communicated using two (2) bursts. Other EVRC speech codecs may produce different size VoIP packets at the respective rates illustrated and the number of bursts required to communicate according to a particular MCS vary accordingly.

FIG. 4 is a table illustrating the downlink burst sizes and corresponding MCSs required to communicate the VoIP packets resulting from an example EVRC vocoder, as represented in FIG. 2, while employing bundling of two VoIP packets (i.e., a bundled packet with two VoIP packets bundled). The examples in the tables of FIGS. 3 and 4 describe the burst-MCS association according to the robustness principle described herein. The burst sizes and MCSs employed correspond to the MAC PDU sizes in Table 2. (Note that in the FIG. 3 illustrates the burst uplink, the 64QAM MCS schemes were not used, as per mobile WiMAX profile Release 1.0).

It may be that multiple candidate MCSs for a particular MAC PDU size result in the same burst size (e.g., same number of OFDMA slots in WiMAX). In such cases, in one embodiment, according to the robustness principle employed by one embodiment, the most robust MCS is actually selected as a candidate MCS for communicating a VoIP packet of that burst size in order to make the system more resilient to interference. For example, a full rate two-hundred-eighty-three (283) bit VoIP packet can be carried out with two (2) OFDMA slots by any of the following MCS schemes: 16QAM Rate ¾, 64QAM Rate ½, 64QAM Rate ⅔, 64QAM Rate ¾, and 64QAM Rate 5/6. According to the robustness principle of this embodiment, 16QAM Rate ¾ will be the MCS considered to carry out a full rate two-hundred-eighty-three (283) bits VoIP packets while employing two (2) OFDMA slots.

The MCS used for transmitting each packet is chosen based on the size of the packet as well as the fast channel quality feedback from the user. Error recovery is carried out using up to a maximum number, N, of HARQ transmissions (first packet transmission plus the allowed retransmissions) with Chase Combining. Chase Combining in WiMAX constrains the retransmissions of a packet to the MCS selected at the first transmission of the packet. Therefore, the VoIP bursts which are employed to carry out the same packet across the first (fresh) transmission, and (eventually) subsequent retransmissions, are all identical in size. (Note that some OFDMA systems may employ the Incremental Redundancy (IR) instead of Chase Combining, but the basic principles of the invention will apply to the IR mode as well).

The three equations below explain the rationale behind the MCS selection mechanism for VoIP packets. For the sake of generality, assume that for a given (not encoded) VoIP packet of size s, there are I possible encoded VoIP bursts, each burst corresponding to a different MCS, and hence resulting in potentially different burst sizes. In other words, each of the I bursts requires a specific number of OFDMA slots, let us note it with $n_i$, when it is encoded with a specific MCS, $m_p$. For example, a full rate 283 bits VoIP packet may be carried out either with 6 OFDMA slots at QPSK Rate ½, or with 4 OFDMA slots at QPSK Rate ¾ or with 3 OFDMA slots at 16QAM Rate ½, or, finally, with just 2 OFDMA slots at 16QAM Rate ¾. With these considerations, it was already assumed that the most robust MCS amongst multiple possible candidates is always employed for the same packet. $P_{e,k}(m_p, n_i)$ is denoted as the probability to have an erroneous packet transmission upon the k-th transmission attempt for a burst of size $n_i$ while employing $m_p$ as MCS. One can determine the expected total number of resources, $E[N_{res}^{succ}(m_p,n_i)]$, that are needed to successfully transmit a burst defined by the parameters $(m_p, n_i)$—see equation (1) below. The rationale is that a packet is successfully transmitted if it is received successfully either in the 1$^{st}$ attempt, or if not in the first then in the second attempt, and so forth, if not in the first N−1 attempts, then certainly in the Nth attempt (the last one).

$$E[N_{res}^{succ}(m_p, n_i)] = n_i(1 - P_{e,1}(m_p, n_i)) + \sum_{k=1}^{N}\left[kn_i P_{e,k}(m_p, n_i)\prod_{j=1}^{k-1} P_{e,j}(m_p, n_i)\right] \quad \text{Eq. (1)}$$

When it is assumed by simplification that the error probabilities across two different transmission attempts of the same packet are the same (e.g. between the 1$^{st}$ and 2$^{nd}$ packet transmissions), then the probability of error for the burst characterized by the parameters $(m_p, n_i)$, $P_e(m_p, n_i)$, does not longer depend on the transmission order of the packet, and the expression for the expected total number of resources in Eq. (1) becomes as in equations Eq. (2). This can be further simplified if the maximum number of allowed transmissions per packet is significantly large—the last expression in Eq. (2).

$$E[N(m_p, n_i)] = \frac{n_i}{(1 - P_e(m_p, n_i))}[1 - (N+1)P_e^N + NP_e^{(N+1)}] \underset{N\to\infty}{=} \frac{n_i}{(1 - P_e(m_p, n_i))} \quad \text{Eq. (2)}$$

One can say that the VoIP packets transmission is optimal if one always selects the combination MCS-burst size $(m_k, n_l)$, which warrants the successful transmission of the VoIP packets with minimum number of OFDMA resources (slots) needed, as expressed in Eq (3) (P stands for the total number of available MCSs).

$$\text{find } (m_k, n_l) \to \min_{\substack{\text{feasible } (m_p, n_i) \\ 1 \le p, k \le P \; 1 \le i, l \le I}} \{E[N_{res}^{succ}(m_p, n_i)]\} \quad \text{Eq. (3)}$$

Note that the probabilities of errors for initial packet transmission and at retransmissions, for a packet of a given size, may be determined from detailed linked level simulations.

In one embodiment, the power level which is applied to a certain packet transmission is determined to guarantee a desired probability of success with a given MCS, and can be controlled either by open or closed power control loops, or by both types of loops together.

Burst Mapping to OFDMA Resources

In one embodiment of this invention, randomized allocations of VoIP bursts across time and frequency are employed in the downlink and uplink sub-frames with tight control of partial load in order to not only reduce but also average the resulting interference. Furthermore, if the VoIP bursts cannot fit into the corresponding sub-frame after a number of random allocation attempts, a search algorithm may employed, which looks for empty locations within the sub-frame, where bursts can be mapped. This is a pragmatic way to reduce interference in real systems, which does not require inter-base station communication. Nevertheless, in one embodiment, inter-base station coordination is employed.

FIG. 5 represents a snapshot of traffic loading of the WIMAX Time Division Duplexing (TDD) downlink (DL) and uplink (UL) sub-frames from two mutually interfering sectors (e.g., sector X and sector Y) according to the principles of the invention. The OFDMA frame structure is shown with telescopic MAPs. The downlink and uplink traffic parts are for illustration purposes only and to illustrate random resource allocation and interference reduction in two interfering sectors. The colored rectangles on the "traffic" region of the downlink and uplink sub-frames represent the VoIP bursts, which follow the burst sizes indicated in the tables of FIGS. 3 and 4. The downlink and uplink overhead parts include conventional overhead known to those skilled in the art of the invention which may include preamble, Frame Control Header (FCH), MAP messages, ACK/NACK channel, sounding, ranging, and channel quality indicator channel (CQICH).

VoIP bursts (e.g., HARQ packet retransmissions and fresh packet transmissions) are scheduled in available resources after accounting for total overhead (preamble, FCH and MAP messages in WIMAX). MAP overhead is composed by the downlink map (DL-MAP) and the uplink map (UL-MAP) overheads. DL-MAP is a Medium Access Control (MAC) message that defines burst start times for a subscriber station on the downlink. UL-MAP supports a set of information that defines the entire access for a scheduling interval. Receive/transmit transition gap (RTG) and transmit/receive transition gap (TTG) are also illustrated.

Each VoIP packet is allocated a delay budget upon arrival at the sender's MAC and is discarded by the MAC if its delivery has not been successfully acknowledged within the delay budget. The resource allocation algorithm accounts for the expansion of the MAP and the resulting shrinkage of traffic resource availability with the scheduling of each VoIP burst within the frame. The example assumes that the size of the MAP messages is controlled by employing SUB-MAP messages, as permitted in the 802.16e standard. These messages allow sending control MAP messages to different groups of users, by using different MCS schemes in order to reduce the total MAP overhead. Note however that this is for illustration purposes, as one or more embodiments of the invention are not dependent on the type of control of the overhead messages, such as MAP messages in WIMAX.

In one embodiment of the invention, the VoIP bursts in downlink are mapped on the frequency domain ("tall" in frequency) in order to exploit the frequency diversity of the wideband wireless channel. Note that the time diversity essentially comes through HARQ transmissions, which are taken place in different frame intervals.

Also, a similar partial loading scheme may be employed in uplink, and in one embodiment, the VoIP bursts are mapped on the time domain first, in order to maximize the power spectral density per subchannel (stretching along time domain), since the mobile terminal operates at a much lower level compared to the downlink transmissions from the base stations.

In another embodiment, the mapping of VoIP bursts to OFDMA resources can be permitted with additional degrees of freedom. For instance, in a different embodiment, in downlink, eventually the VoIP bursts can be also mapped in time domain first, and then in frequency domain, and vice-versa for the uplink direction.

Figure 6:
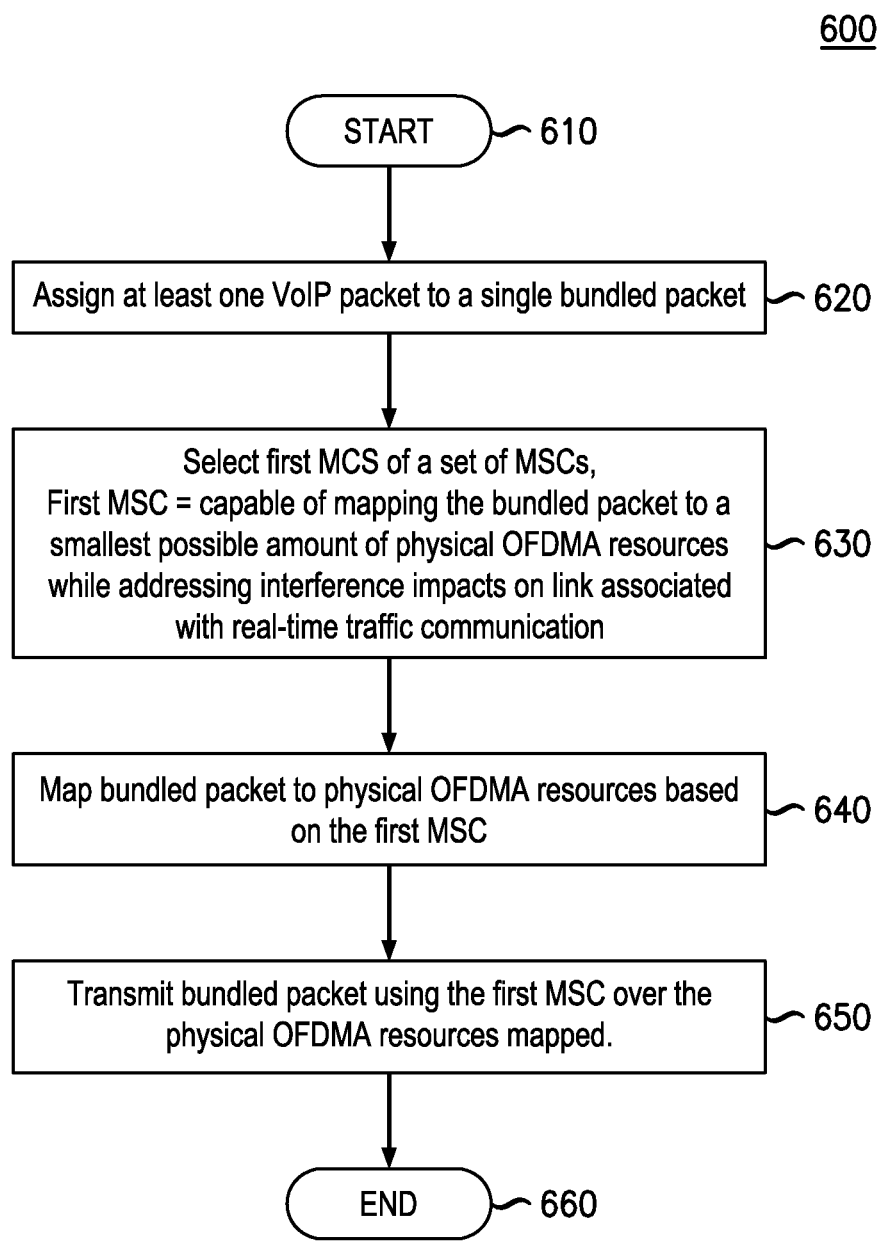
FIG. 6 is an example flow chart which details a radio resource allocation mechanism for providing VoIP service over OFDMA based access systems and enabling efficient allocation of radio resources to VoIP packets in order to minimize the effects of the interference.

FIG. 6 is an example flow chart which details a radio resource allocation methodology for providing VoIP service over OFDMA based access systems and enabling efficient allocation of radio resources to VoIP packets in order to minimize the effects of the interference. The methodology 600 includes rate selection which allows dynamic selection of the MCS employed such that the likelihood of success for a packet transmission over wireless channels is maximized while the number of OFDMA resources utilized is minimized. Embodiments of the disclosed methodology for resource allocation strive to increase the spectral efficiency and VoIP capacity of a wireless based OFDMA system handling real-time traffic communication At operation 610, the method starts.

At operation 620, one or more Voice Over Internet Protocol (VoIP) packets are assigned to a single bundled packet. In one embodiment, assigning VoIP packets to a single bundled packet includes assigning a plurality of VoIP packets to the single bundled packet for transmission in downlink from a base station to a mobile device. Accordingly, the described methodology may be performed at a base station, access point or other similar network element of a wireless communication system. In one embodiment, assigning VoIP packets to a single bundled packet includes assigning one VoIP packet to the single bundled packet for transmission in uplink from a mobile device to a base station. Accordingly, the described methodology may be performed at a mobile device user equipment, mobile station or other similar network element of a wireless communication system. Bundling of a single packet into a bundled packet may elsewhere herein be referred to no bundling. In both the uplink and downlink situations, assigning VoIP packets to a single bundled packet may also include varying the number of VoIP packets assigned to the single bundled packet in accord with at least one radio channel condition of the link associated with the real-time traffic communication. The number of VoIP packets that are bundled may vary from time-to-time. For example, for each VoIP packet to be assigned to a bundle, the method may determine a desirable number of next packets to accumulate in the bundled packet. Packet bundling may be performed dynamically, per Mobile Station (MS), both in downlink and uplink, or either in downlink or in uplink in order to exploit the quality peaks in radio channel conditions a mobile device may observe, and to enable opportunistic users and packets scheduling.

At operation 630, a first modulation and coding scheme (MCS) of a set of MCSs, is selected. The first MCS is one of the set of MCSs capable of mapping the bundled packet to a smallest possible amount of physical OFDMA resources while addressing one or more negative impacts of interference on a link associated with the real-time traffic communication. The smallest possible amount of physical OFDMA resources includes at least one time symbol and at least one subcarrier within an OFDMA frame or OFDMA sub-frame. In one embodiment, the method selects as the first MCS a MCS of a subset of the set of MCSs for mapping the bundled packet to a smallest possible amount of physical OFDMA resources that also maximizes the probability of success of communication of the bundled packet. In one embodiment, the method selects as the first MCS a most robust MCS scheme of a sub-set of the set of MCSs which produce a burst of similar size after a VoIP packet encoding.

At operation 640, the bundled packet is mapped to the smallest possible amount of physical OFDMA resources based on the first MCS selected. The mapping may include randomized allocations of VoIP bursts across time and frequency in one or more of downlink OFDMA sub-frames and OFDMA uplink sub-frames. This is performed so as in order to not only reduce but also average the resulting interference. Mapping may be further performed with tight control of partial load which means fitting the largest number of bundled packets within available slots of an OFDMA frame or OFDMA sub-frame.

In one embodiment, the mapping includes a number of random allocation attempts to fit a VoIP burst within an OFDMA frame or OFDMA sub-frame. In another embodiment, the mapping may include employing a search algorithm to find one or more suitable locations within an OFDMA frame or OFDMA sub-frame where a VoIP burst can be fit. The mapping may also include employing a search algorithm to find one or more suitable locations within the OFDMA frame or the OFDMA sub-frame where the VoIP burst can be fit when the number of random allocation attempts fails to produce a successful allocation for the VoIP burst. The mapping may be performed with inter-base station coordination. In other words, mapping of the bundled packet to physical OFDMA resources may be performed with or without inter-base station coordination.

In one embodiment, the mapping may be performed prioritizing for downlink exploitation of frequency diversity. That is; a VoIP burst, for example a VoIP burst in the downlink OFDMA subframe, is mapped on the frequency domain ("tall" in frequency) in order to exploit the frequency diversity. In another embodiment, the mapping may be performed prioritizing for uplink exploitation of time domain. That is; a VoIP burst, for example a VoIP burst in the uplink, is mapped to the time domain first. The time domain is prioritized so as not to cut the transmit power of the transmitter which would reduce range of signal transmission. In another embodiment, the bundled packet mapped to the smallest possible amount of physical OFDMA resources while a VoIP burst is first mapped in the time domain and then in the frequency domain, or vice-versa.

At operation 650, the bundled packet is transmitted over the smallest possible amount of physical OFDMA resources mapped using the first MCS selected. The bundled packet is thus transmitted over wireless channels while employing the minimum number of OFDMA resources and having a determined maximum probability of successful communication.

At operation 660, the method ends. The method may be realized on a packet by packet basis.

Embodiments according to the principles of the invention may provide one or more of the following benefits:

Enhanced VoIP capacity of a OFDMA based wireless access system through a MCS selection mechanism that maximizes the probability of success of a packet transmission while minimizing the number of OFDMA resources that need to be employed during the packet transmission/retransmission process.

Interference reduction through usage of minimum radio resources required to carry out a packet transmission successfully.

Interference averaging through randomized allocation of VoIP bursts across time/frequency resources.

Reduced signaling: no need for explicit exchange of interference levels among base stations.

Dynamic packet bundling per Mobile Station (MS), both in downlink and uplink, or either in downlink or in uplink, exploiting the quality peaks in radio channel conditions a MS may observe, and enabling opportunistic users and packets scheduling.

Figure 7:
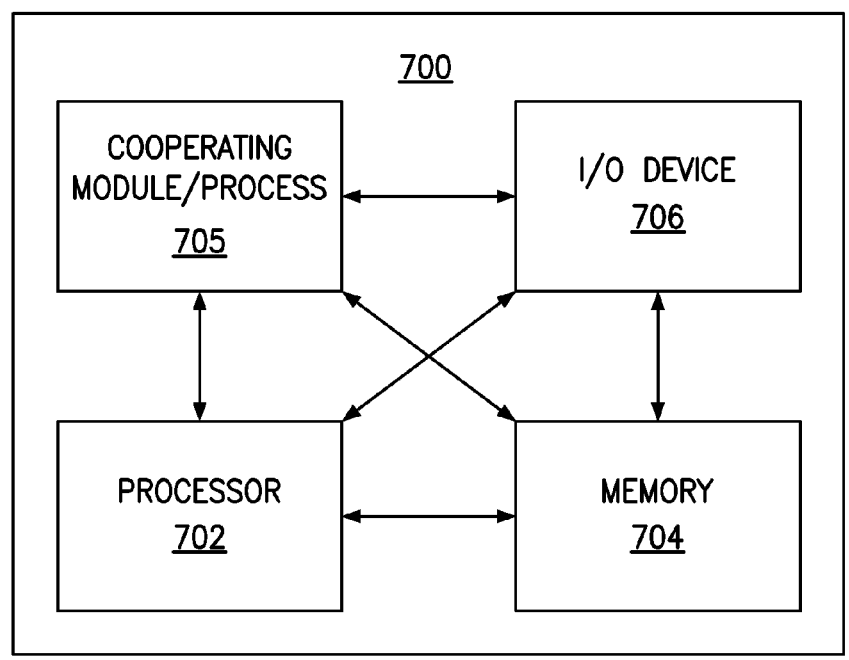
FIG. 7 depicts a high-level block diagram of a computer suitable for use in performing functions described herein.

FIG. 7 depicts a high-level block diagram of a computer suitable for use in performing functions described herein. The computer 700 includes a processor 702 (e.g., a central processing unit (CPU) or other suitable processor(s)) and a memory 704 (e.g., random access memory (RAM), read only memory (ROM), and the like). The computer 700 also may include a cooperating module/process 705. The cooperating process 705 can be loaded into memory 704 and executed by the processor 702 to implement functions as discussed herein and, thus, cooperating process 705 (including associated data structures) can be stored on a computer readable storage medium, e.g., RAM memory, magnetic or optical drive or diskette, and the like.

The computer 700 also may include one or more input/output devices 706 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 700 depicted in FIG. 7 provides a general architecture and functionality suitable for implementing functional elements described herein or portions of functional elements described herein. For example, the computer 700 provides a general architecture and functionality suitable for implementing one or more of a mobile device, a base station, a wireless access point a network element and the like suitable for providing a portion wireless communication network.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of one or more of the methods described herein. The program storage devices may be non-transitory media, e.g., digital memories, magnetic storage media such as a magnetic disks or tapes, hard drives, or optically readable digital data storage media. In one or more embodiments, tangible medium excluding signals may include a set of instructions which when executed are operable to perform one or more of the descried methods. The provided embodiments are also intended to be embodied in computers programmed to perform said steps of methods described herein.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

While the description above is accompanied by examples, which are based on the 802.16e standard (WiMAX), the principles of the invention apply to any other OFDMA based communication system, such as those proposed and developed by third generation partnership projects 3GPP and 3GPP2, for instance.

The invention claimed is:

1. An apparatus for allocating resources to real-time traffic communication in an Orthogonal Frequency Division Multiple Access (OFDMA) based system, the apparatus comprising a processor and an associated memory, wherein the processor is configured to:
assign one or more Voice Over Internet Protocol (VoIP) packets to a single bundled packet;
select a first modulation and coding scheme (MCS) of a set of MCSs, the first MCS being the one MCS of the set of MCSs capable of mapping the bundled packet to a smallest possible amount of physical OFDMA resources while addressing one or more negative impacts of interference on a link associated with the real-time traffic communication;
map the bundled packet to the smallest possible amount of physical OFDMA resources based on the first MCS selected; and
transmit the bundled packet using the first MCS selected over the smallest possible amount of physical OFDMA resources mapped;
wherein, the first MCS is selected for mapping the bundled packet to a smallest possible amount of physical OFDMA resources such that the selected first MCS also maximizes the probability of success of communication of the bundled packet.

2. The apparatus of claim 1, wherein the smallest possible amount of physical OFDMA resources include at least one time symbol and at least one subcarrier within an OFDMA frame or OFDMA sub-frame.

3. The apparatus of claim 1, wherein the processor is configured to:
assign a plurality of VoIP packets to the single bundled packet for transmission in a downlink.

4. The apparatus of claim 1, wherein the processor is configured to:
assign one VoIP packet to the single bundled packet for transmission in an uplink.

5. The apparatus of claim 1, wherein the processor is configured to:
vary a number of VoIP packets assigned to the single bundled packet in accord with at least one radio channel condition of the link associated with the real-time traffic communication.

6. The apparatus of claim 1 wherein the processor is configured to:
randomize allocations of VoIP bursts across time and frequency in one or more of downlink OFDMA sub-frames and OFDMA uplink sub-frames.

7. The apparatus of claim 1 wherein the processor is configured to:
perform a number of random allocation attempts to fit a VoIP burst within an OFDMA frame or OFDMA sub-frame.

8. The apparatus of claim 7 wherein the processor is configured to:
employ a search algorithm to find one or more suitable locations within the OFDMA frame or the OFDMA sub-frame where the VoIP burst can be fit if the number of random allocation attempts fails to produce a successful allocation for the VoIP burst.

9. The apparatus of claim 1 wherein the processor is configured to:
employ a search algorithm to find one or more suitable locations within an OFDMA frame or OFDMA sub-frame where a VoIP burst can be fit.

10. The apparatus of claim 1 wherein the processor is configured to:
map the bundled packet to the smallest possible amount of physical OFDMA resources while employing inter-base station coordination.

11. The apparatus of claim 1 wherein the processor is configured to:
map the bundled packet to the smallest possible amount of physical OFDMA resources for downlink while prioritizing exploitation of frequency diversity.

12. The apparatus of claim 1 wherein the processor is configured to:
map the bundled packet to the smallest possible amount of physical OFDMA resources for uplink prioritizing exploitation of time domain.

13. The apparatus of claim 1 wherein the processor is configured to:
map the bundled packet to the smallest possible amount of physical OFDMA resources wherein a VoIP burst is mapped in time domain first, and then in frequency domain.

14. The apparatus of claim 1 wherein the processor is configured to:
select a most robust MCS scheme of a sub-set of the set of MCSs which produce a burst of similar size after a VoIP packet encoding.

15. A method for allocating resources to real-time traffic communication in an Orthogonal Frequency Division Multiple Access (OFDMA) based system, the method comprising:
assigning at a network element one or more Voice Over Internet Protocol (VoIP) packets to a single bundled packet;
selecting at the network element a first modulation and coding scheme (MCS) of a set of MCSs, the first MCS being the one MCS of the set of MCSs capable of mapping the bundled packet to a smallest possible amount of physical OFDMA resources while addressing one or more negative impacts of interference on a link associated with the real-time traffic communication;

mapping at the network element the bundled packet to the smallest possible amount of physical OFDMA resources based on the first MCS selected; and transmitting from the network element the bundled packet using the first MCS selected over the smallest possible amount of physical OFDMA resources mapped;

wherein the smallest possible amount of physical OFDMA resources include at least one time symbol and at least one subcarrier within an OFDMA frame or OFDMA sub-frame; and wherein the first MCS is selected for mapping the bundled packet to a smallest possible amount of physical OFDMA resources such that the selected first MCS also maximizes the probability of success of communication of the bundled packet.

16. The method of claim 15, wherein said assigning comprises:

varying a number of VoIP packets assigned to the single bundled packet in accord with at least one radio channel condition of the link associated with the real-time traffic communication.

17. The method of claim 15 wherein said mapping the bundled packet to the smallest possible amount of physical OFDMA resources includes at least one or randomized allocations of VoIP bursts across time and frequency in one or more of downlink OFDMA sub-frames and OFDMA uplink sub-frames, and employing a search algorithm to find one or more suitable locations within an OFDMA frame or OFDMA sub-frame where a VoIP burst can be fit.

18. The method of claim 15 wherein said mapping the bundled packet to the smallest possible amount of physical OFDMA resources is performed prioritizing for exploitation of frequency diversity or performed prioritizing exploitation of time domain.

19. The method of claim 15 wherein said selecting the MCS of the set of MCSs for mapping the bundled packet to a smallest possible amount of physical OFDMA resources maximizes the probability of success of communication of the bundled packet.

* * * * *